Figure 1:
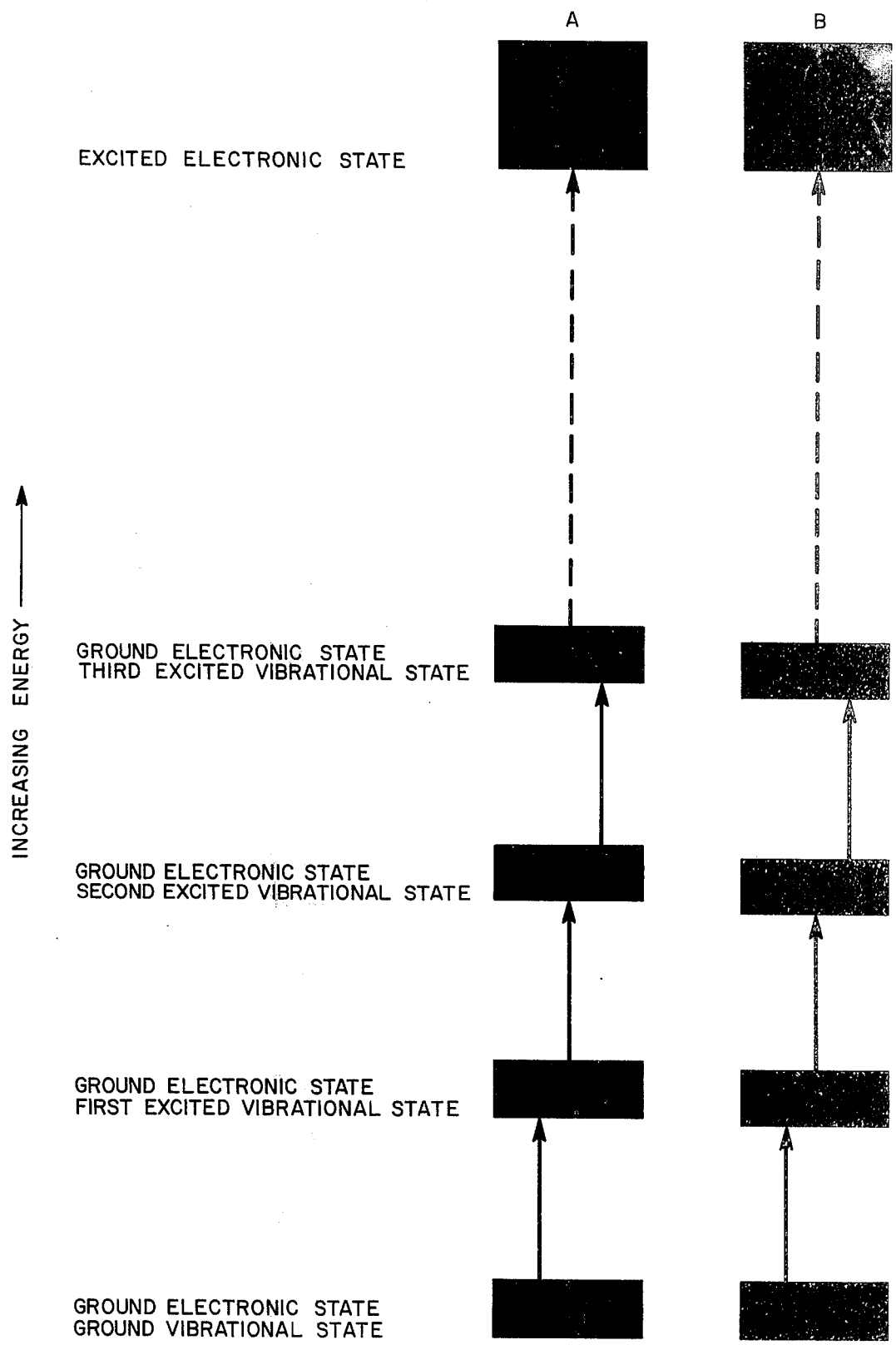

United States Patent [19]

Lyon

[11] 3,937,956
[45] Feb. 10, 1976

[54] ISOTOPE SEPARATION PROCESS
[75] Inventor: Richard K. Lyon, Fanwood, N.J.
[73] Assignee: Exxon Research & Engineering Company, Linden, N.J.
[22] Filed: Oct. 23, 1973
[21] Appl. No.: 408,669

[52] U.S. Cl............ 250/290; 250/298; 204/157.1 R; 204/162 R
[51] Int. Cl............................................. H01j 39/34
[58] Field of Search............ 204/157.1, 155, 162 R; 250/290, 298

[56] References Cited
UNITED STATES PATENTS
3,443,087  5/1969  Robieux et al...................... 250/290
3,772,519  11/1973  Levy et al........................... 250/290

FOREIGN PATENTS OR APPLICATIONS
1,959,767  6/1971  Germany........................ 204 L Dig.
2,312,194  10/1973  Germany.................... 204 L Dig.

Primary Examiner—Howard S. Williams
Attorney, Agent, or Firm—R. J. Baran

[57] ABSTRACT

The instant invention relates to a process for separating a material into two or more parts in each of which the abundances of the isotopes of a given element differ from the abundances of the isotopes of the same material in said material. In one embodiment, the invention relates to a method for the isotopically selective excitation of gas phase molecules by multiple infrared photon absorption followed by selective dissociation of said excited molecules by the absorption of a single photon of visible or ultraviolet light. This invention is useful for, but not limited to, the separation of the principal isotopes of uranium.

11 Claims, 2 Drawing Figures

ISOTOPE SEPARATION PROCESS

FIELD OF THE INVENTION

The instant invention relates to a process for separating a material into two or more parts in each of which the abundances of the isotopes of a given element differ from the abundances of the isotopes of the same material in said material. In one embodiment, the invention relates to a method for the isotopically selective excitation of gas phase molecules by multiple infrared photon absorption followed by selective dissociation of said excited molecules by the absorption of a single photon of visible or ultraviolet light. This invention is useful for, but not limited to, the separation of the principal isotopes of uranium.

BACKGROUND OF THE PRIOR ART

In order that the instant invention may be clearly understood, it is useful to review the prior art relating to photochemical isotope separation. U.S. Pat. No. 2,713,025 and British Pat. No. 1,237,474 are good examples of processes for the photochemical separation of the isotopes of mercury. The first requirement for a photochemical isotope separation is that one finds conditions such that atoms or molecules of one isotope of a given element absorb light more strongly than do atoms or molecules of another isotope of said element. Mercury is a volatile metal and readily forms a vapor of atoms. Said atoms absorb ultraviolet light at 2537 A. The absorption line of $Hg^{202}$ is displaced by about 0.01 A with respect to the absorption line of $Hg^{200}$. Since the absorption lines are extremely narrow, one may by use of a light in a critically narrow wavelength region excite either $Hg^{200}$ or $Hg^{202}$ without substantially exciting the other, depending on the exact wavelength used.

The second requirement for a photochemical isotope separation is that those atoms or molecules which are excited by light undergo some process which the atoms or molecules which have not been excited do not undergo, or at least do not undergo as rapidly. A quantum of 2537 A ultraviolet light imparts an excitation of 112.7 Kcal/mole to the mercury atom which absorbs it. The number of mercury atoms which at room temperature are thermally excited to this energy is vanishingly small, hence the atoms excited by light are not diluted by atoms excited by thermal means. Atoms of this high excitation readily undergo reactions with $H_2O$ (as taught in the U.S. Patent) or with $O_2$, HCl or butadiene (as taught in the British patent), said reactions not occurring at room temperature with unexcited mercury.

Uranium, however, is a highly refractory metal, boiling only at extremely high temperatures. Thus use of the above described process with uranium atoms instead of mercury involves obvious difficulties. The most volatile form of uranium is $UF_6$. $U^{235}F_6$ and $U^{238}F_6$ both absorb ultraviolet light and do so to exactly the same extent at all wavelengths in the UV; hence, UV excitation of $UF_6$ does not satisfy the first requirement of photochemical isotope separation. However, $UF_6$ will also absorb infrared light in the region around 626 $cm^{-1}$ (the $\nu_3$ band) and 189 $cm^{-1}$ (the $\nu_4$ band). Both the $\nu_3$ and $\nu_4$ bands of $U^{235}F_6$ are shifted slightly toward higher energy with respect to the $\nu_3$ and $\nu_4$ bands of $U^{238}F_6$ respectively, but the size of these shifts is small compared to the width of the bands; in other words, the infrared absorption spectra of $U^{238}F_6$ and $U_{235}F_6$ do not exactly coincide, but they overlap at all wavelengths so that if one isotope absorbs light, so, to a substantial degree, will the other. Hence the infrared excitation of $UF_6$ by absorption of a single IR photon is a process of limited isotopic selectivity.

The second requirement for isotope separation is also a matter of some difficulty for $UF_6$. $UF_6$ molecules which are excited by IR light are no different from molecules which have received the same energy by thermal excitation. Whatever process the photo-excited molecules will undergo, those molecules which are thermally excited to the same energy will also undergo. This dilution of the photo-excited molecules with thermally excited molecules will further decrease the isotopic separation factor.

The process of the instant invention is schematically illustrated in FIG. 1. This process is applicable to isotopic separation of uranium isotopes using $UF_6$ but is by no means limited thereto. Hence, in FIG. 1 let A designate a molecule containing an atom of the lighter isotope of some element whose isotopes we desire to separate and let B designate the corresponding molecule containing the heavier isotope of said element. The ways in which a molecule may contain energy are called the degrees of freedom. It is well known that molecules have three different kinds of internal degrees of freedom, rotational, vibrational, and electronic. That is, a molecule may contain energy by spinning about its axis, it may contain energy because its atoms are vibrating against each other, and it may contain energy by virtue of having one or more of its electrons in higher energy orbits.

All of these forms of energy are quantized, that a molecule may hold only certain discrete amounts of energy in each of these forms. In general, for a given molecule the rotational quanta will be the smallest and the electronic the largest. A molecule containing the absolute minimum posssible energy would be said to be in the ground electronic, ground vibrational, ground rotational state. Because rotational quanta are very small, rotationally excited states are populated even at very low temperatures. Hence in FIG. 1 the ground vibrational state of the ground electronic level is shown not as a single line but as a band because within the ground vibrational, ground electronic state the molecules are distributed among many rotational levels.

The instant invention is a three step process, the first step being that the molecules to be isotopically separated are irradiated with a high power infrared laser under a critical set of conditions described hereinafter. The effect of this irradiation is to cause molecules of A and B to absorb IR photons and be progressively excited from the ground vibrational state to the first excited vibrational state, to the second excited vibrational state, to the third excited vibrational state, etc. It is to be noted that spacing between the vibrational levels of A and B is not exactly the same, although the difference in spacing of the levels is small compared to their width. Thus both A and B absorb the infrared laser radiation, but depending on the wavelength of the laser one will do so faster than the other. Hence, the isotopic selectivity of the absorption process is compounded as molecules are progressively excited up the vibrational ladder. Further, the total vibrational energy given the molecule is that of several infrared photons; hence the molecules are excited to levels but little populated by thermal means and dilution of photoexcited molecules by thermally excited molecules is minimized.

It will at once be realized that if A and B are polyatomic molecules they have several vibrational degrees of freedom. $UF_6$, for example, has 15° of freedom, but because of its symmetry only six normal modes of vibration. Thus, to specify the vibrational state of $UF_6$ one must specify how many quanta of vibrational energy are in each of these six modes. The ground state would be designated $UF_6$ (0,0,0,0,0,0). If the IR laser were tuned to the $\nu_3$ band of $UF_6$, the sequential excitation process shown in FIG. 1 would be described by $UF_6$ (0,0,0,0,0,0) + $h_\nu$ ⟶ $UF_6$ (0,0,1,0,0,0)
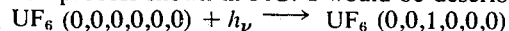
$UF_6$ (0,0,1,0,0,0) + $h_\nu$ ⟶ $UF_6$ (0,0,2,0,0,0)
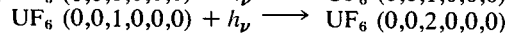
$UF_6$ (0,0,2,0,0,0) + $h_\nu$ ⟶ $UF_6$ (0,0,3,0,0,0) It is well known that $UF_6$ has many low energy vibrational states which at room temperature are substantially populated. Hence, the sequential excitation process shown in FIG. 1 is not the only such process occurring but is merely a representative of many similar processes.

The second step of the instant invention is the irradiation of the molecules to be isotopically separated with visible or ultraviolet light from a second laser. It is to be done under a set of hereinafter described critical conditions. Let there be a critical vibrational energy content, $E_v$, such that molecules with greater than said vibrational energy content may absorb photons from said second laser and become electronically excited while molecules with less than said critical energy either do not absorb or absorb said photons more slowly. The molecules in said excited electronic state undergo a chemical reaction which the molecules in the ground electronic state undergo more slowly if at all.

Thus in the first two steps of the instant invention, A and B are converted with isotopic selectivity into some chemically different substance. The third step of the instant invention is the recovery of said substance by any of the means known in the art.

From the above description, the instant invention is readily distinguished from the prior art. Thus U.S. Pat. No. 3,443,087 teaches the separation of $U^{235}F_6$ from $U^{238}F_6$ by selectively exciting one of them with an infrared laser then ionizing said excited molecules with ultraviolet light and recovering the ions by means of electric and/or magnetic fields of chemical reactions. In a review entitled "Photochemical Isotope Separation As Applied To Uranium" (Union Carbide Corporation Nuclear Division, Oak Ridge Gaseous Diffusion Plant, Mar. 15, 1972, K-L-3054, Revision 1, page 29), Farrar and Smith discuss the abovementioned patent and comment unfavorably on the practicality of the proposed second step of photoionization. As an alternative, they suggest photodissociation. However, both U.S. Pat. No. 3,443,087 and Farrar and Smith explicitly teach that each $UF_6$ molecule undergoing the photoexcitation step acquires an energy corresponding to one infrared photon. Thus, neither Farrar and Smith nor U.S. Pat. No. 3,443,087 teach, show or suggest the use of multiple IR photon absorption.

British patent No. 1,284,620, German patent No. 1,959,767 and German patent No. 2,150,232 teach the use of infrared radiation of excited molecules, said excited molecules to undergo some chemical reaction which the unexcited molecules undergo more slowly. The energy given the molecules during the infrared excitation step is explicitly taught to be the energy of a single IR photon, and these references neither teach, show, nor suggest the use of multiple infrared photon absorption.

It is to be recognized that excitation by multiple infrared photon absorption is entirely different from repeating the step of excitation by single infrared photon absorption. The conditions necessary to achieve excitation by single infrared photon absorption are merely that molecules be irradiated with infrared radiation of an appropriate wavelength. A set of critical conditions must be maintained if multiple infrared photon absorption is to occur. Multiple infrared photon absorption requires the use of a high power infrared laser, specifically said laser must emit at least $10^4$ watts per $cm^2$ per torr pressure of the gas which contains the isotopes that are being separated. Further, the time the gas molecules are subjected to this high power infrared radiation must be between $10^{-10}$ and $5 \times 10^{-5}$ seconds. Thus if the sum of the partial pressures of A and B is 2 torr, a power density of at least $2 \times 10^4$ watts/$cm^2$ is required. Failure to use at least this critical power density will have the result that the time required for the multiple photon excitation process will not be short compared to the average interval between collisions of A and B molecules. During such collisions, transfer of vibration excitation may occur, with the result that the excitation process loses its isotopic selectivity.

The second requirement for a multiple infrared photon absorption is the presence of a second gas, the partial pressure of said gas being at least 5, preferably between 5 and 100,000 times the partial pressure of A and B. Said second gas may be any substance chemically different from A and B, but $H_2$, $N_2$, $O_2$, He, Ne, Ar, Kr and Xe are most preferred. The reason said second gas is needed is subtle and relates to an effect known as anharmonicity. The levels of the vibrational ladder shown in FIG. 1 are not exactly uniformly spaced but become slightly closer together as one goes up the ladder. This effect is known as anharmonicity, because for a perfect harmonic oscillators the energy levels would be uniformly spaced. It is also well known that a molecule in a given rotational state J may absorb infrared radiation and go the next higher vibrational level and either rotational level quantum number J + 1, rotational level quantum number J, or rotational level quantum number J-1. Hence for a group of molecules in a thermal equilibrium distribution, there are three distinct absorption processes and the infrared absorption band is composed of three branches, the R branch (transitions in which the rotational quantum number increases by 1), the Q branch (transitions in which the rotational quantum number is not changed), and the P branch (transitions in which the rotational quantum number decreases by 1). The effect of anharmonicity upon the process of the instant invention is as follows: Let the infrared laser emit radiation of wavelength $\lambda$. Let said wavelength $\lambda$ be within the R branch of an infrared absorption band of A and B. There will be some rotational quantum number J such that molecules of A in the ground vibrational state may absorb radiation of wavelength $\lambda$ and be raised to the first excited vibrational state and rotational state J + 1. However because of anharmonicity, molecules of A must be in some rotational state other than J + 1 in order to absorb radiation of wavelength $\lambda$ and go from the first to the second vibrational state. Thus a means by which molecules may change their rotational state is needed. Any molecular collision may cause rotational relaxation, i.e. put molecules back into a thermal distribution among the rotational energy levels, but if said collision is between A and B molecules transfer of vibrational excitation may also occur. This would have the effect of destroying the isotopic selectivity of the excitation process. Accordingly, it is the teaching of this invention that a second gas be provided as specified above in order that rotational relaxation may occur during the sequential excitation process.

The sequential excitation process may occur if the above critical requirements are met, if said process is to have an optimum isotopic selectivity other requirements must be met. The first of these requirements relates to the degree of conversion achieved in the first step. If nearly all of the irradiated A and B molecules are excited to vibrational energies such that they may undergo step 2, then the product collected in step 3 will have nearly the same isotopic composition as the starting material and only a poor isotope separation will be achieved. On the other hand, if an extremely low degree of conversion is used, the molecules which are isotopically selectively excited by infrared radiation will be substantially diluted with those which are nonselectively excited by thermal means. Hence there clearly exists an optimum conversion for the first step of the instant invention. The energy density to which the A and B molecules are subjected must be controlled to achieve said optimum conversion. The optimum energy density depends to some extent on the exact wavelength which the IR laser emits, but it is preferred that the molecules undergoing isotopic separation be subjected to no less than $10^{-3}$ joules/cm$^2$ nor more than $10^3$ joules/cm$^2$ during the performance of step one of the instant invention.

The optimum wavelength for the infrared laser depends on what molecule is being used. If A and B are $U^{235}F_6$ and $U^{238}F_6$ operation of the IR laser is in the range 620 to 645 cm$^{-1}$ (the R branch of the $\nu_3$ band of $UF_6$) or in the range 189 cm$^{-1}$ to 204 cm$^{-1}$ (the R branch of the $V_4$ band). In general, one may use the R branch of any vibrational band, provided that said band corresponds to a normal mode of vibration in which there is participation by atoms of the element whose isotopes it is desired to separate. The R branch is preferred because it is preferred to selectively excite A, that is to selectively excite molecules containing the lighter of the isotopes being separated. The reason for this is related to anharmonicity. As a molecule is progressively excited up the vibrational ladder, its absorption spectra shifts toward lower energy. Thus, if the infrared laser is operating on the low energy edge of the absorption band, the P branch, the rate at which molecules will absorb IR radiation increases as they go up the vibrational ladder, but the isotopic selectivity of said absorption decreases. Conversely, if the laser is operating in the R branch, the rate of radiation absorption decreases but the isotopic selectivity increases. This is a more favorable situation for the overall separation.

In FIG. 1, $E_v$ is shown as three times the energy of a vibrational quanta. $E_v$ may be greater or less than this without going beyond the scope of this invention.

The laser used in the second step must supply photons corresponding to the difference between the energy required for the chosen photochemical process and $E_v$. The wavelength at which the second step laser operates thus depends on the molecule which contains the isotope being separated, the photochemical process chosen, and the desired value of $E_v$. In the case of $UF_6$, it is preferred that the photochemical process should be photodissociation, $UF_6 + h\nu \longrightarrow UF_5 + F$ and that the second step laser should operate in the range 2400 A to 4600 A.

The time during which molecules of the gas which contains the isotopes being separated are subjected to radiation from the second step laser must be between $10^{-10}$ and $5 \times 10^{-5}$ seconds. Further, the total time the molecules of the gas which contain the isotopes being separated are subjected to radiation during both the first and second steps of the instant invention must be between $10^{-10}$ and $5 \times 10^{-5}$ seconds; however, it is not necessary that the first step be completed before the second step is begun.

Figure 2:
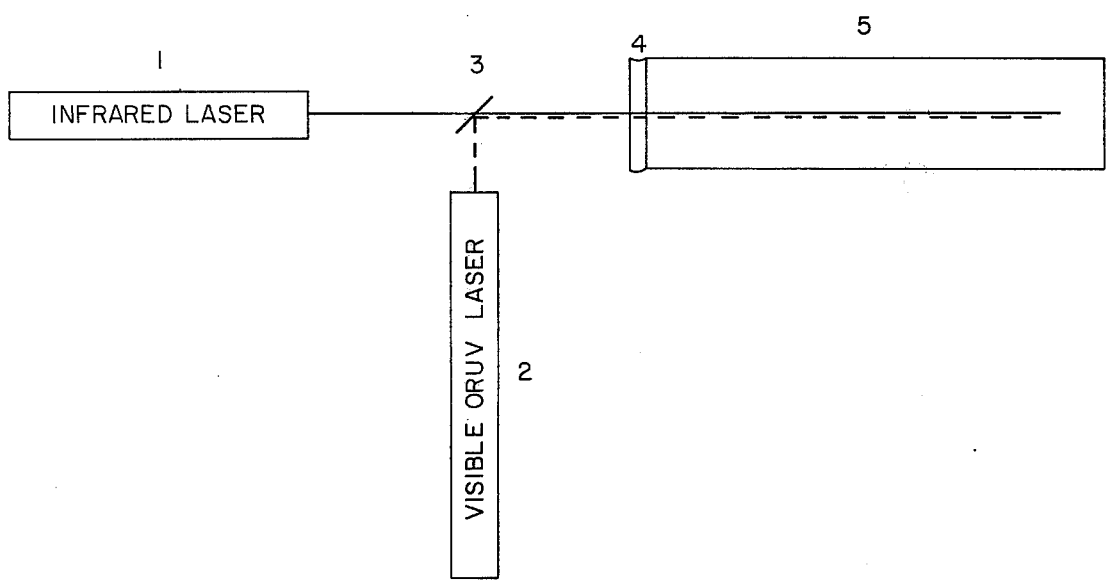

An apparatus suitable for the performance of this invention is shown in FIG. 2. The infrared laser (1) must be operated in accord with the teaching of this invention concerning minimum power density, and optimum energy density. There are numerous IR lasers known in the art and one must be chosen which can be adjusted to emit radiation within the R branch of an infrared absorption of the gas which contains the isotopes being separated. For operation on $UF_6$, one may use an HF laser which can emit at 629.16 cm$^{-1}$. The visible or ultraviolet laser may be a dye laser tuned to whatever wavelength is desired.

The object labeled 3 is a mirror transparent to infrared light but reflecting visible or UV light. By this means, the output light beams from lasers 1 and 2 are made colinear. The light beams pass through window 4 and into a vessel containing the gas which contains the isotopes to be separated. The time that molecules of said gas are exposed to radiation from the lasers may be limited by any of several means. The gas may be flowing so that molecules are swept into and out of the irradiated volume in a time of $5 \times 10^{-5}$ sec. or less. The irradiated volume may be made very narrow by focusing the lasers so that molecules diffuse out of said volume in an average time of $5 \times 10^{-5}$ seconds or less. The lasers may be pulsed, each pulse lasting less than $5 \times 10^{-5}$ seconds. The time between pulses should be greater than $10^{-3}$ seconds.

PREFERRED EMBODIMENT

Uranium ore of natural isotopic distribution is converted to $UF_6$ vapor by means well known in the art. Said $UF_6$ is placed within the photolysis cell of the apparatus shown in FIG. 2. The temperature of said cell is in the temperature range 200°K to 400°K. The partial pressure of $UF_6$ in said cell is preferably in the range $10^{-4}$ to 100 torr. Said cell also contains a gas chosen from the group hydrogen, nitrogen, oxygen, helium, neon, argon, krypton and xenon at a partial pressure of 5 to 100,000 times the partial pressure of the $UF_6$. If helium, neon, argon, krypton or xenon or mixtures thereof are used as the second gas, then a third gas is also added to the photolysis cell at a partial pressure preferably less than or at most equal to the partial pressure of $UF_6$. Said third gas is any substance which will react rapidly and irreversibly with either $UF_5$ radical or atomic fluorine, examples of such substances include hydrogen, the gaseous hydrocarbons, e.g. $C_1$ to $C_{10}$, e.g. alkanes, alkynes, aromatics, alkenes, etc., HCl, HBr, HI, and $H_2S$.

The above mixture of $UF_6$ with said second and third gases is subjected to irradiation by an IR laser and a UV laser. Said IR laser is preferably operated in a pulsed mode, the time between pulses being at least $10^{-3}$ sec., and the pulse duration between $10^{-10}$ and $5 \times 10^{-5}$ seconds. The power density of light from the IR laser to which said gas mixture is subjected preferably is at least $10^4$ watts per $cm^2$ per torr of partial pressure of $UF_6$ and the energy density per pulse preferably is not less than $10^{-3}$ joules/$cm^2$ nor more than $10^3$ joules/$cm^2$. The wave length of the IR laser preferably is in the range 620 to 645 $cm^{-1}$ or 189 to 204 $cm^{-1}$. The UV laser preferably operates in the range 2400°A to 4600°A. The UV light from said laser passes through the photolysis cell colinearly with the light from the IR laser. The UV laser is preferably operated in a pulsed mode, the time between pulses being at least $10^{-3}$ sec. and the pulse duration less than $5 \times 10^{-5}$ sec. The light pulses from the UV laser should occur at the same time as or within $5 \times 10^{-5}$ sec. of the light pulses from the IR laser.

The photolytic cell may be operated as either a batch or continuous reactor. In the former case the gas mixture in the reactor is subjected to enough laser pulses to produce the desired degree of photodecomposition of the $UF_6$, then the undecomposed $UF_6$ which is depleted in $U^{235}$ and the product of the photodecomposition which enriched in $U^{235}$ are recovered by any of the means well known in the art. Should a higher degree of enrichment be desired, then by means well known in the art the photodecomposition product may be converted to $UF_6$ and the process of the instant invention repeated. Likewise, if the undecomposed $UF_6$ is not depleted to the desired level, further depletion may be achieved by repeating the process of the instant invention. The techniques of staging isotopic separation so as to achieve desired levels of enrichment in the product and depletion in the tails are well known. Once the desired enrichment level is reached, the product may be made into nuclear reactor fuel rods by the methods well known in the art.

What is claimed is:

1. A method of separating the isotopes of an element, said method being applied to a gaseous compound of said element, said method comprising subjecting the molecules of said compound to IR radiation at a predetermined frequency by means of an IR laser, said gaseous compound being irradiated by said IR laser at a power density of at least $10^4$ watts per $cm^2$ per torr pressure of said gaseous compound for a time of between $10^{-10}$ and $5 \times 10^{-5}$ seconds and wherein a second gas is present along with said gaseous compound, said second gas partial pressure being at least 5 times the partial pressure of said gaseous compound, whereby the molecules containing the lighter isotope or isotopes are preferentially excited and absorb more than one quanta of IR radiation, subjecting said gaseous mixture to radiation at the second predetermined frequency within the visible or ultraviolet spectrum, said second predetermined frequency being selected to convert said excited molecules to a form whereby they may be separated from the nonexcited molecules, and separating said converted molecules.

2. The method of claim 1 wherein said visible or ultraviolet radiation source is a visible or ultraviolet laser.

3. The method of claim 1 wherein the excited molecules are photodissociated by said visible or ultraviolet laser.

4. The method of claim 1 wherein said second gas is selected from the group consisting of hydrogen, nitrogen, oxygen, helium, neon, argon, krypton and xenon.

5. The method of claim 4 wherein said gaseous compound is subjected to IR light at an energy density of between $10^{-3}$ joules per $cm^2$ and $10^3$ joules per $cm^2$.

6. The method of claim 5 wherein said gaseous compound is subjected to radiation from said visible or ultraviolet laser for less than $5 \times 10^{-5}$ seconds.

7. The method of claim 6 wherein said IR laser operates at a wave length corresponding to an R branch of a vibrational absorption band of said gaseous compound.

8. The method of claim 6 wherein said gaseous compound is $UF_6$.

9. The method of claim 8 wherein said IR frequency ranges from 620 to 645 $cm^{-1}$.

10. The method of claim 8 wherein said IR frequency ranges from 189 to 204 $cm^{-1}$.

11. The method of claim 8 wherein said second predetermined frequency ranges from 2400 to 4600°A.

* * * * *

Disclaimer and Dedication 3,937,956.—*Richard K. Lyon*, Fanwood, N.J. ISOTOPE SEPARATION PROCESS. Patent dated Feb. 10, 1976. Disclaimer and dedication filed July 24, 1978, by the assignee, *Exxon Research and Engineering Company.*

Hereby disclaims and dedicates to the Public the entire remaining term of said patent.

[*Official Gazette September 19, 1978.*]